(12) United States Patent
Chu et al.

(10) Patent No.: US 9,081,776 B2
(45) Date of Patent: Jul. 14, 2015

(54) METHOD AND APPARATUS FOR DIRECTLY WRITING MULTIMEDIA DATA ON DIGITAL DEVICE

(71) Applicant: SAMSUNG ELECTRONICS CO., LTD., Suwon-si (KR)

(72) Inventors: Chang-nam Chu, Yongin-si (KR); Jong-il Choi, Seoul (KR); Do-gyoon Kim, Seongnam-si (KR); Young-sup Kim, Seongnam-si (KR); Hyo-sung Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/245,163

(22) Filed: Apr. 4, 2014

(65) Prior Publication Data

US 2014/0222846 A1 Aug. 7, 2014

Related U.S. Application Data

(63) Continuation of application No. 11/499,701, filed on Aug. 7, 2006, now Pat. No. 8,725,722.

(30) Foreign Application Priority Data

Aug. 8, 2005 (KR) .......................... 10-2005-072412

(51) Int. Cl.
*G06F 7/00* (2006.01)
*G06F 17/30* (2006.01)
*G11B 27/034* (2006.01)
(Continued)

(52) U.S. Cl.
CPC ........ *G06F 17/30017* (2013.01); *G11B 27/034* (2013.01); *G11B 27/329* (2013.01); *G11B 27/34* (2013.01); *Y10S 707/913* (2013.01)

(58) Field of Classification Search
CPC ....................... G06F 17/30017; Y10S 707/913
USPC ................................... 707/722, 913
See application file for complete search history.

(56) References Cited

U.S. PATENT DOCUMENTS 6,339,832 B1 1/2002 Bowman-Amuah
2004/0122773 A1* 6/2004 McCombs et al. .............. 705/52
(Continued)

FOREIGN PATENT DOCUMENTS

JP 2001-014773 A 1/2001
JP 2001-215974 A 8/2001
(Continued)

*Primary Examiner* — Greta Robinson
*Assistant Examiner* — Brian E. Weinrich
(74) *Attorney, Agent, or Firm* — Sughrue Mion, PLLC

(57) ABSTRACT

A method and apparatus for directly writing multimedia data onto a digital device are provided. The method includes sensing multimedia data written on a storage medium; displaying a user interface screen to display the multimedia data and a folder for a digital device; receiving a command to write the multimedia data in the folder; converting the multimedia data to a format which is playable by the digital device; and writing the converted data in the folder. The apparatus includes a sense unit which senses multimedia data written on a storage medium; a display unit which displays a user interface screen; an input unit which provides input in the form of a command to write the multimedia data in a folder; and a converting and writing unit which converts the multimedia data to a format which is playable by the digital device and writes the converted multimedia data in the folder.

15 Claims, 4 Drawing Sheets

(51) Int. Cl.
　　*G11B 27/32*　　(2006.01)
　　*G11B 27/34*　　(2006.01)
　　*G06F 15/16*　　(2006.01)

(56) References Cited

U.S. PATENT DOCUMENTS

| | | | |
|---|---|---|---|
| 2004/0199654 A1* | 10/2004 | Juszkiewicz | 709/231 |
| 2004/0210593 A1* | 10/2004 | Hirano et al. | 707/999.101 |
| 2005/0117466 A1* | 6/2005 | Strachota | 369/30.27 |
| 2005/0125082 A1* | 6/2005 | Hanson et al. | 700/19 |

FOREIGN PATENT DOCUMENTS

| | | |
|---|---|---|
| JP | 2002-184095 A | 6/2002 |
| JP | 2003-319365 A | 11/2003 |
| JP | 2004-127186 A | 4/2004 |
| JP | 2005-190566 A | 7/2005 |
| KR | 10-2002-0061927 A | 7/2002 |
| KR | 10-2002-0088854 A | 11/2002 |
| KR | 10-2002-0090552 A | 12/2002 |
| KR | 10-2004-0022736 A | 3/2004 |
| WO | 015589 A1 | 8/2001 |
| WO | 2004-097655 A1 | 11/2004 |

* cited by examiner

METHOD AND APPARATUS FOR DIRECTLY WRITING MULTIMEDIA DATA ON DIGITAL DEVICE

CROSS-REFERENCE TO RELATED APPLICATIONS

This is a Continuation of U.S. application Ser. No. 11/499,701 filed Aug. 7, 2006, which claims priority from Korean Patent Application No. 10-2005-0072412 filed on Aug. 8, 2005 in the Korean Intellectual Property Office, the disclosure of which is incorporated herein in its entirety by reference.

BACKGROUND OF THE INVENTION

1. Field of the Invention

Methods and apparatuses consistent with the present invention relate to directly writing multimedia data onto a digital device, and more particularly, to converting multimedia data written in a storage medium to a format playable in a digital device using only one operation, and copying or moving the multimedia data to a folder for the digital device at the same time.

2. Description of the Related Art

Because there are more and more kinds of digital devices and because of increased contact of users with digital devices, it has become important to provide a better user interface. Generally, it is necessary to interface with a personal computer (PC) in order to write multimedia data onto a digital device. It is possible to write multimedia data only when multimedia data stored in the PC is copied or moved to a digital device via a connection medium such as a Universal Serial Bus (USB). To write audio data stored in an audio compact disc (CD) onto a digital device, multiple steps are necessary. The audio data must be converted to data that employs a format writable on the digital device (e.g., MPEG-1 Audio Layer 3 (MP3) or Windows Media Audio (WMA)), and be stored in the PC. Then, the audio data must be written onto the digital device by a user's manipulation of a user interface. Writing the data stored in an audio CD onto a digital device will be described in reference to FIG. 1.

FIG. 1 illustrates writing contents stored in an audio CD onto a digital device according to a related art.

After inserting an audio CD that stores audio data into PC (S12), a user selects a track to be converted by executing a converting program such as a ripping program, and then sets an option such as setting a bitrate, selecting a storage directory, or determining whether to use a CD database (CDDB) server (S14). The selected track in the audio CD is converted to a playable format (e.g., MP3 or WMA format) for use on a digital device by using the converting program, and then is stored in a storage directory of a local PC (S16). A user connects the digital device to a PC by using an USB, and selects a data file to be written on the digital device connected with the PC by executing a searching program (S18). The selected file is written onto the digital device by dragging and dropping it (S20).

However, it is inconvenient for a user because several steps are needed to write audio CD data onto a digital device. For example, a user has to select several options (e.g., selecting a storage directory, setting a bitrate, determining whether to use a CDDB server) in ripping the audio CD. Moreover, if the user does not remember the directory of the PC where the ripped file is stored, the user must search each directory for the file in order to locate and move the data onto a digital device. That is, moving data in a digital device consists of several steps, making it inconvenient for a user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for directly converting multimedia data to be playable and writing multimedia data on a digital device by dragging and dropping at the same time.

According to an aspect of the present invention, there is provided a method for directly writing multimedia data on a digital device comprising sensing multimedia data written on a storage medium, displaying a user interface screen to show the multimedia data and a folder for a digital device, receiving a command to write the multimedia data into the folder for the digital device, converting the multimedia data to a format which is playable by the digital device; and writing the converted multimedia data into the folder for the digital device.

According to a further aspect of the present invention, there is provided an apparatus for directly writing multimedia data on a digital device comprising a sense unit which senses multimedia data written on a storage medium, a display unit which displays a user interface screen to show the multimedia data and a folder for a digital device, an input unit which provides input in the form of a command to write the multimedia data in the folder for the digital device, and a converting and writing unit which converts the multimedia data to a format which is playable by the digital device and writes the multimedia data into the folder for the digital device. Desirably, the present invention further comprises an information receiving unit to receive multimedia metadata written in the storage medium by connecting a contents database server for storing multimedia metadata.

According to another exemplary embodiment of the present invention, there is provided a computer readable storage medium having stored thereon an executable program for executing a method comprising sensing multimedia data written on a storage medium; displaying a user interface screen to show the multimedia data and a folder for a digital device; receiving a command to write the multimedia data into the folder for the digital device; converting the multimedia data to a format which is playable by the digital device; and writing the converted multimedia data into the folder for the digital device.

BRIEF DESCRIPTION OF THE DRAWINGS

The above and other aspects of the present invention will become more apparent by describing in detail certain exemplary embodiments thereof with reference to the attached drawings in which.

DETAILED DESCRIPTION OF THE INVENTION

Figure 1:
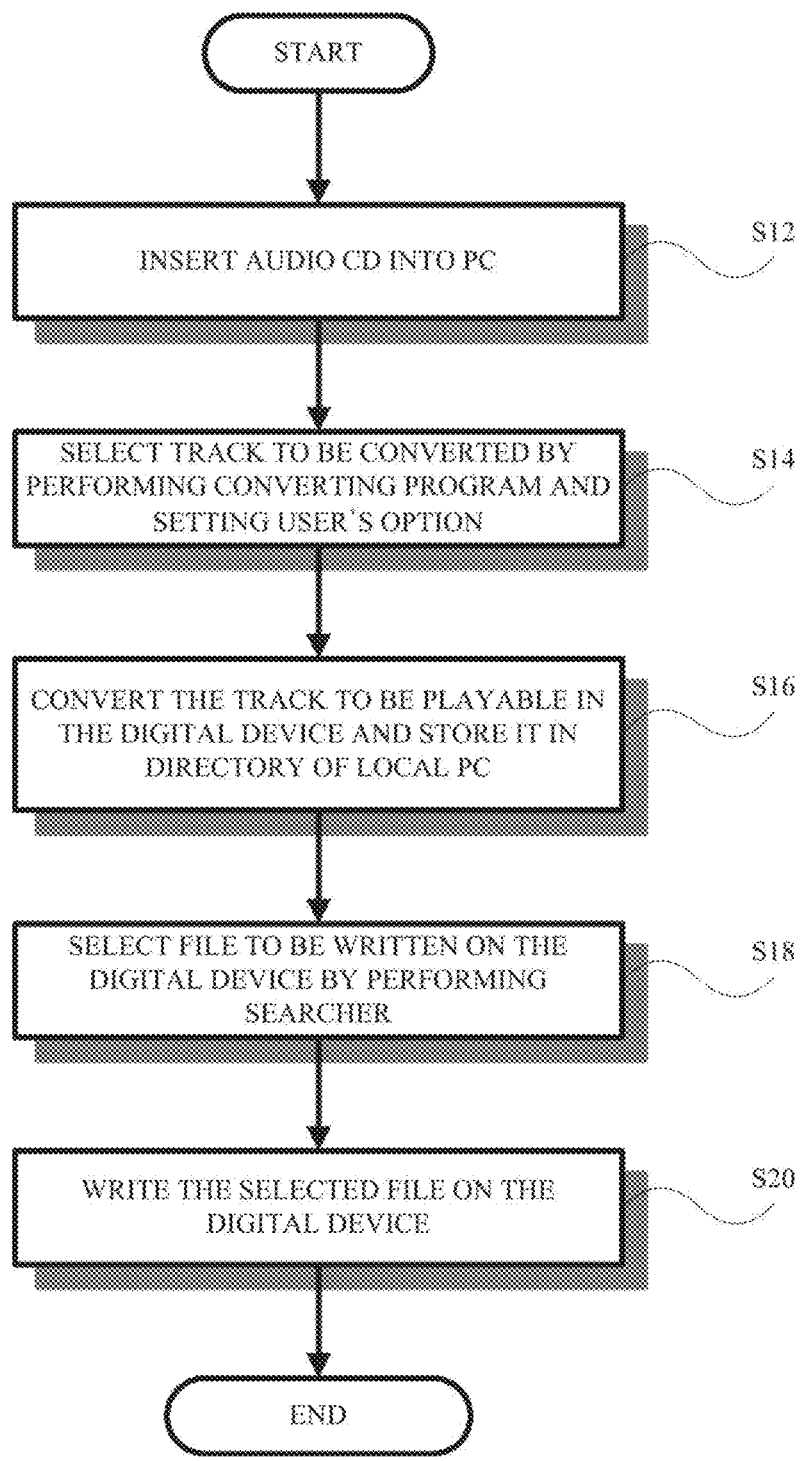
FIG. 1 illustrates writing contents stored in an audio CD on a digital device according to a related art.

It is comprehended that specific matters of other exemplary embodiments of the present invention not disclosed herein will be implied by the detailed description and drawings of certain exemplary embodiments of the present invention described herein.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 2:
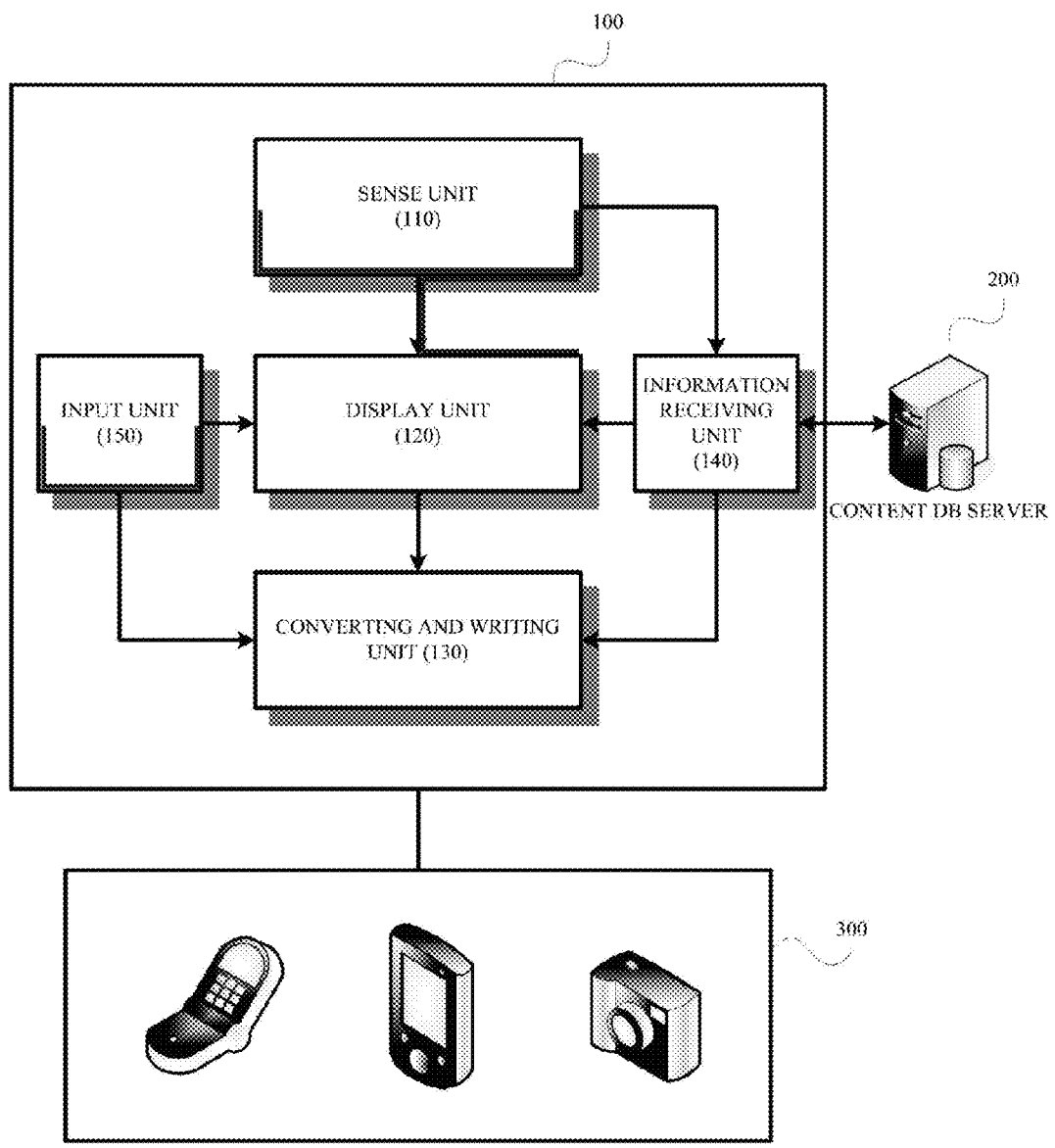
FIG. 2 illustrates an apparatus for directly writing multimedia data according to an exemplary embodiment of the present invention.

FIG. 2 illustrates an apparatus for writing multimedia data on a digital device according to an exemplary embodiment of the present invention.

An apparatus 100 illustrated in FIG. 2 comprises a sense unit 110, a display unit 120, a converting and writing unit 130, an information receiving unit 140, and an input unit 150. A content database (DB) server 200 transmits and receives information with the information receiving unit 140. A digital device 300 is connected to the apparatus 100 by USB, or other such connection method.

The digital device 300 may be a cellular phone, a camera, a personal digital assistant, or other such device.

The sense unit 110 senses multimedia written on a storage medium. If a user selects the track, and locates it in the MP3 player by dragging and dropping it in order to move a track of an audio CD to a MP3 player, the sense unit 110 recognizes the track to write in the digital device 300, and drives the information receiving unit 140, which will be described later.

The display unit 120 displays a user interface screen where multimedia data and a folder for the digital device 300 to write the multimedia data is displayed by receiving information on progressing status in present via a converting and writing unit 130.

The input unit 150 receives a movement command to write multimedia data in a folder for the digital device 300. It is desirable that the order is executed by dragging and dropping with a mouse.

The converting and writing unit 130 writes the multimedia data in the folder for the digital device, and converts the multimedia data to be playable in the digital device at the same time.

The information receiving unit 140 searches a content DB server 200 where multimedia metadata is being stored for the corresponding multimedia metadata, and receives it when multimedia data is sensed via the sense unit 110 by inserting a storage medium such as an audio CD into a PC. Specifically, the information receiving unit 140 determines whether multimedia data corresponding to the track is in the content DB server by transmitting information on the track received from the sense unit 110. As the result, if multimedia data corresponding to the track is in the content DB server 200, the information receiving unit 140 receives the multimedia metadata, and forwards it to the converting and writing unit 130, which will be described later.

The converting and writing unit 130 writes the multimedia data in the folder for the digital device 300, and converts the multimedia data to be playable in the digital device by using multimedia metadata received from the information receiving unit 140 at the same time. The converting and writing unit 130 also writes tag information (e.g., ID3Tag V1, ID3Tag V2) about multimedia data converted to be playable in the digital device 300 in a folder for the digital device 300 together.

In the present invention, the storage medium refers to hard disk drive, audios, videos, CD, digital versatile disc (DVD), web hard, transportable storage medium, content server to provide multimedia data via wire and wireless network, and a medium where multimedia data, which has yet been converted to be playable in the digital device, is stored. Accordingly, the present inventive concept is applied not only when content stored in a CD is written on the digital device 300 but also when a multimedia file is directly downloaded to the digital device 300 via Internet.

An exemplary method for directly writing multimedia data on a digital device will be described with reference to FIGS. 3, 4 and 5.

Figure 3:
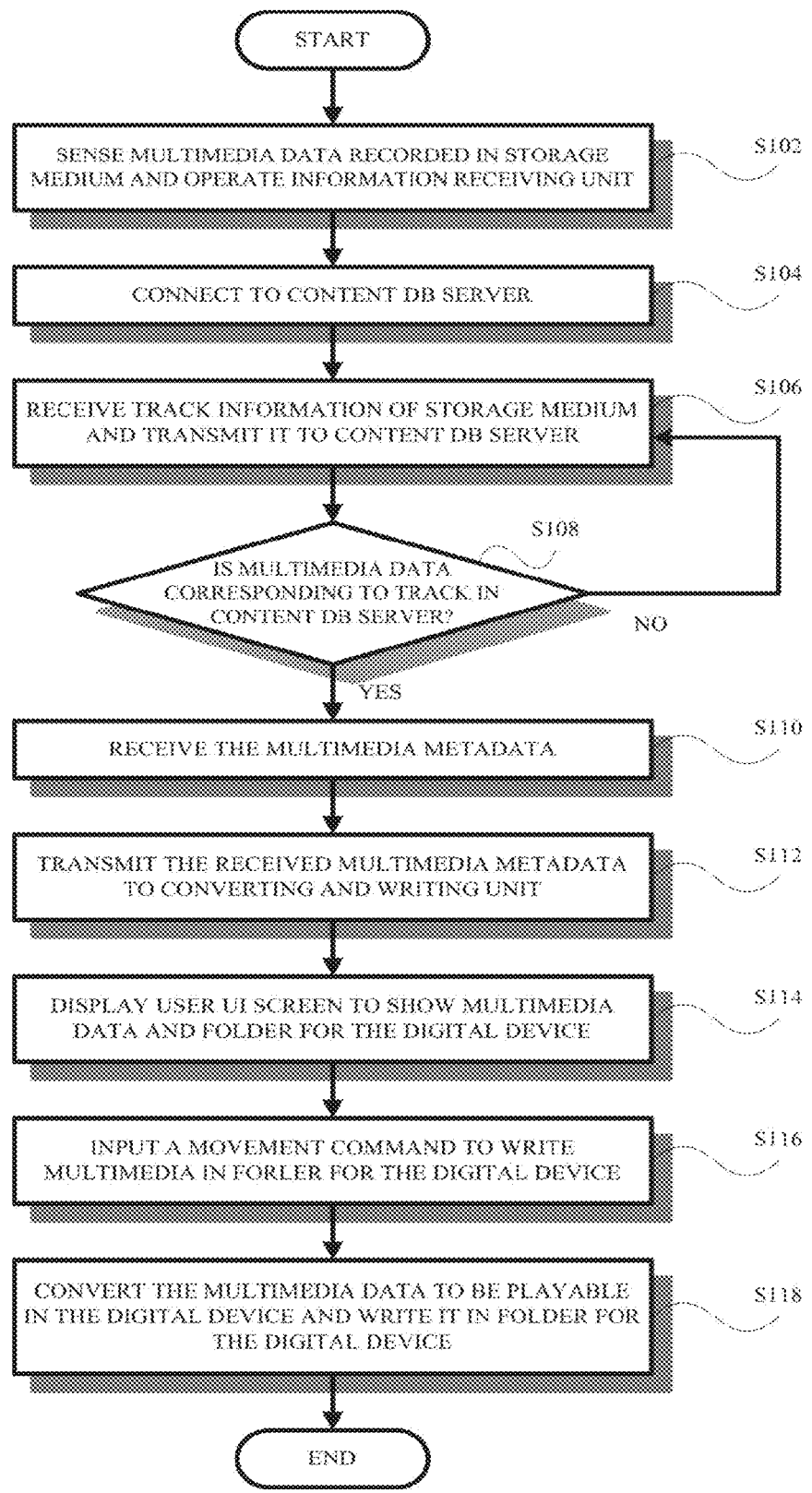
FIG. 3 is a flowchart showing a method for directly writing multimedia data on a digital device according to an exemplary embodiment of the present invention.

FIG. 3 is a flowchart showing a method for directly writing multimedia data on a digital device according to an exemplary embodiment of the present invention. FIG. 4 illustrates displaying a user UI screen to display multimedia data and a folder for a digital device according to an exemplary embodiment of the present invention. FIG. 5 illustrates showing a user UI screen to display that multimedia data is converted to be playable in a digital device, and is written in a folder for a digital device according to an exemplary embodiment of the present invention.

The sense unit 110 operates the information receiving unit 140 after sensing multimedia data written on the storage medium (S102). After connecting to the content DB server 200 (S104), the information receiving unit 140 receives track information on the storage medium, and then transmits it to the content DB server 200 (S106). Then the information receiving unit 140 determines whether the multimedia data corresponding to the track is in the content DB server 200 (S108).

If the multimedia data corresponding to the track is in the content DB server 200, the information receiving unit 140 will receive the multimedia metadata (S110). If the multimedia data is not in the content DB server 200, another track is received at operation S106. Then the information receiving unit 140 transmits the received multimedia metadata to the converting and writing unit 130 (S112).

The display unit 120 displays a user screen to display the multimedia data and a folder for the digital device 300 to write the multimedia data (S114). The user interface screen will be displayed after the sense unit 110 senses multimedia is written on a storage medium. If the digital device 300 is connected with the apparatus 100 via wire or wireless, the corresponding folder is displayed on the left side of FIG. 4. As an exemplary embodiment of the present invention, a screen that displays writing contents stored in an audio CD in a MP3 player is illustrated. Referring to the left side of FIG. 4, folders such as "my MP# player", "my PC", "music store", and "my audio-CD" are displayed on a directory as "music library". Audio file information in "my audio-CD" is displayed on the right side of FIG. 4. In displaying the information, the information receiving unit 140 transmits track information of the audio CD received by the sense unit 110 after connecting to the content DB server 200, at this time, if the multimedia data that has track information on the audio CD is in the content DB server, the information receiving unit 140 will receive the multimedia metadata. Then the display unit 120 displays the received information.

Figure 4:
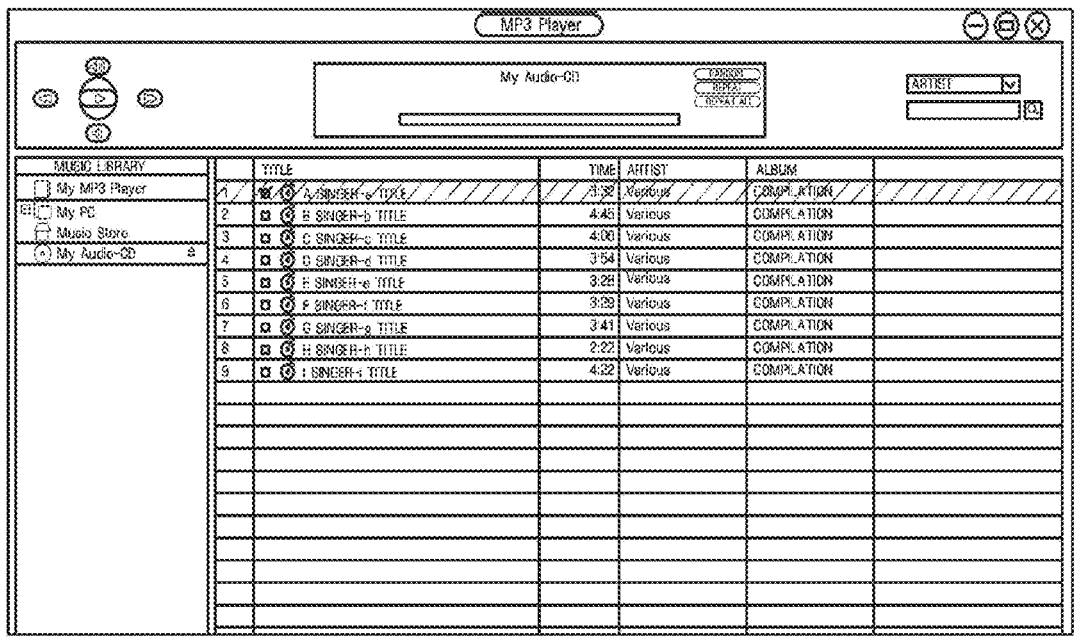
FIG. 4 illustrates displaying a user interface screen to show multimedia data and a folder for a digital device according to an exemplary embodiment of the present invention.
Figure 5:
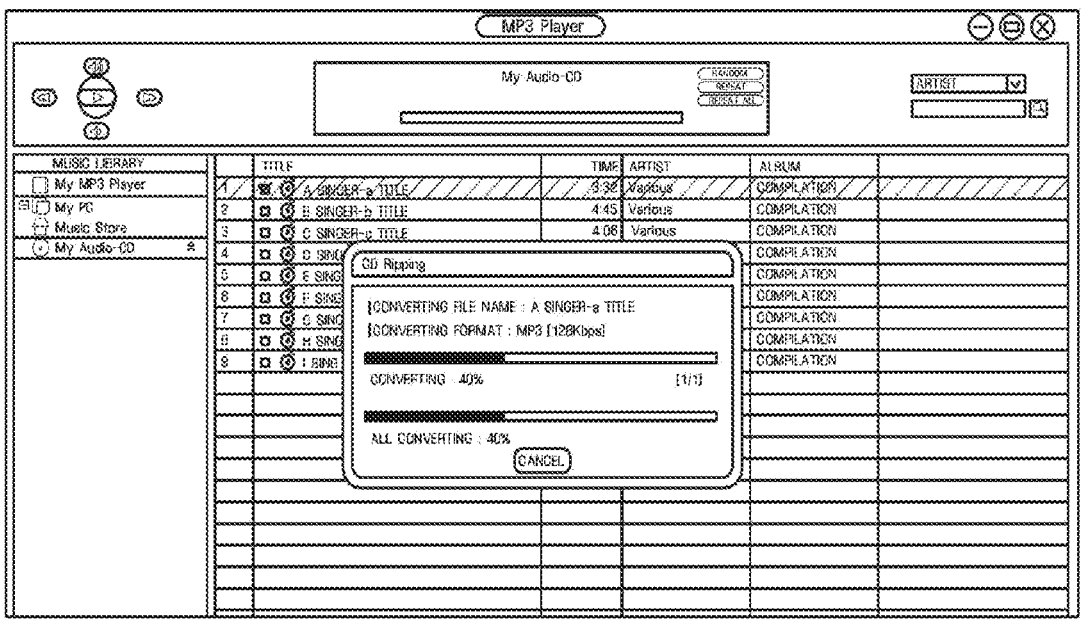
FIG. 5 illustrates displaying a user interface screen to show that multimedia data is converted to be playable in a digital device, and is written on a folder for a digital device according to an exemplary embodiment of the present invention.

A user inputs a movement command to the input unit 150 to write the multimedia data file shown at the left side of FIG. 4 in a folder for the digital device (S116). That is, dragging and dropping are operated to write the file displayed at right side of FIG. 4 in the folder for the digital device. Writing refers to copying and moving a multimedia data file.

In converting the sensed multimedia data to be playable in the digital device 300 and writing it in a folder for the digital device 300 as a last step, desirably, the converting and writing unit 130 converts the multimedia data to be playable in the digital device 300 by using multimedia metadata received from the information receiving unit 140, and writes the multimedia data in the folder for the digital device 300 at the same time (S118). At this time, tag information according to a format (e.g., MP3 or WMA) for multimedia data able to be played in a digital device is also written in the folder for the digital device 300.

When an audio file dragged and dropped by a user is written in "my MP3 player" folder, it is converted to a MP3 format file playable in a MP3 player, and is written in "my MP3 player" folder. Referring to FIG. 5, converting a music file "A singer—a title" among the content files stored in an audio CD to a MP3 file is shown at center window of the screen of FIG. 5. Especially, a ripping program refers to converting digital sound data to a file able to be processed in a computer, i.e., the program abstracts the digital sound data written on a music CD, converts the data to the file able to be processed in a computer, and then saves the data. At this time, a tool for abstracting and converting data refers to ripping software, ripping tools, or rippers.

The storage medium refers to a hard disk drive, audios, videos, CD, DVD, web hard, transportable storage medium, content server to provide multimedia data via wire and wireless network, or a medium where multimedia data, which has yet been converted to be playable in the digital device, is stored.

It is to be understood that the scope and spirit of the present invention also includes a writing medium to write a machine-readable program necessary for carrying out the method for directly writing multimedia data on a digital device described in the above exemplary embodiments of the present invention.

According to the present invention, it is possible for a user to write a multimedia file on a digital device by one operation, without having to set options when the multimedia file is converted to a format playable in a digital device.

According to the present invention, operation may be simple because if a file is downloaded to a PC after user's authentication when downloading a digital file via Internet, a file may be converted and written on a digital device at the same time.

The effects of the present invention are not limited to the above-described advantages, and other effects, not described, will be clearly understood by those skilled in the art from the description of the accompanying claims.

Although certain exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for writing multimedia data using an apparatus for writing multimedia data, the method comprising:
    sensing multimedia data written on at least one storage medium from among a plurality of storage media;
    receiving first information on the at least one storage medium and transmitting the received first information to a server;
    determining whether the multimedia data corresponding to the first information is in the server;
    receiving metadata of the multimedia data from the server if it is determined that the multimedia data corresponding to the first information is in the server;
    connecting a digital device via wire or wireless;
    displaying a user interface screen to show the multimedia data and a folder corresponding to the connected digital device;
    receiving a command to write the multimedia data in the folder for the digital device, the command comprising dragging the multimedia data and dropping the multimedia data and;
    automatically converting, in response to receiving the command, the multimedia data to a format which is playable by the digital device and writing the converted multimedia data to the digital device,
    wherein the first information includes track information, and
    wherein the server is a content database server.

2. The method of claim 1, wherein in the receiving the command, the command is received from an input device.

3. The method of claim 2, wherein the input device is a mouse, and the command is received by dragging and dropping using the mouse.

4. The method of claim 1, wherein the converting the multimedia data comprises:
    converting the multimedia data using the metadata of the multimedia data; and
    writing the converted multimedia data in the folder for the digital device.

5. The method of claim 4, wherein converting the multimedia data further comprises writing tag information together with the multimedia data, which is converted to the format which is playable by the digital device, in the folder for the digital device.

6. The method of claim 1, wherein the storage medium comprises one of a hard disk drive, a compact disc, a digital versatile disc, a web-based storage device, a transportable storage medium, a content server which provides multimedia data via a wired or a wireless network, and a medium where multimedia data, which has yet to be converted to a format which is playable by the digital device, is stored.

7. An apparatus for writing multimedia data, the apparatus comprising:
    a sense unit which senses multimedia data written on at least one storage medium from among a plurality of storage media;
    an information receiving unit which receives first information on the at least one storage medium, transmits the received first information to a server, determines whether multimedia data corresponding to the first information is in the server, and receives metadata of the multimedia data from the server if it is determined that the multimedia data corresponding to the first information is in the server;
    connecting unit which connects a digital device via wire or wireless;

a display unit which displays a user interface screen to show the multimedia data and a folder corresponding to the connected digital device;

an input unit which inputs a command to write the multimedia data in the folder corresponding to the digital device; and a converting and writing unit which automatically converts, in response to inputting of the command, the multimedia data to a format which is playable by the digital device, and writes the converted multimedia data to the digital device, wherein the first information includes track information, and wherein the server is a content database server.

8. The apparatus of claim 7, wherein the information receiving unit receives the metadata of the multimedia data by connecting to the content database (DB) server.

9. The apparatus of claim 8, wherein the information receiving unit determines whether the multimedia data corresponding to the track information is in the content DB server by transmitting the received track information from the sense unit to the content DB server, and receives the metadata of the multimedia data if the multimedia data is in the content DB server.

10. The apparatus of claim 7, wherein the input unit receives the command from an input device.

11. The apparatus of claim 10, wherein the input device comprises a mouse, and the command is generated by dragging and dropping using the mouse.

12. The apparatus of claim 8, wherein the converting and writing unit converts the multimedia data to a format which is playable by the digital device by using the multimedia metadata received from the information receiving unit, and writes the multimedia data in the folder for the digital device.

13. The apparatus of claim 8, wherein the converting and writing unit writes tag information together with the multimedia data which is converted to a format which is playable by the digital device in the folder for the digital device.

14. The apparatus of claim 7, wherein the storage medium comprises one of a hard disk drive, audios, videos, a compact disc, a digital versatile disc, a web-based storage device, a transportable storage medium, a content server which provides multimedia data via a wired or a wireless network, and a medium where multimedia data, which has yet to be converted to a format which is playable by the digital device, is stored.

15. A computer readable storage medium having stored thereon an executable program for executing a method for writing multimedia data using an apparatus for writing multimedia data, the method comprising:

sensing multimedia data written on at least one storage medium from among a plurality of storage media;

receiving first information on the at least one storage medium and transmitting the received first information to a server;

determining whether the multimedia data corresponding to the first information is in the server;

receiving metadata of the multimedia data from the server if it is determined that the multimedia data corresponding to the first information is in the server;

connecting a digital device via wire or wireless;

displaying a user interface screen to show the multimedia data and a folder corresponding to the connected digital device;

receiving a command to write the multimedia data in the folder for the digital device, wherein the command comprises dragging the multimedia data and dropping the multimedia data and;

automatically converting, in response to receiving the command, the multimedia data to a format which is playable by the digital device and writing the converted multimedia data to the digital device, wherein the first information includes track information, and wherein the server is a content database server.

* * * * *